A. A. Evans.
Collar.
No. 2309. Reissued. July 10. 1866.
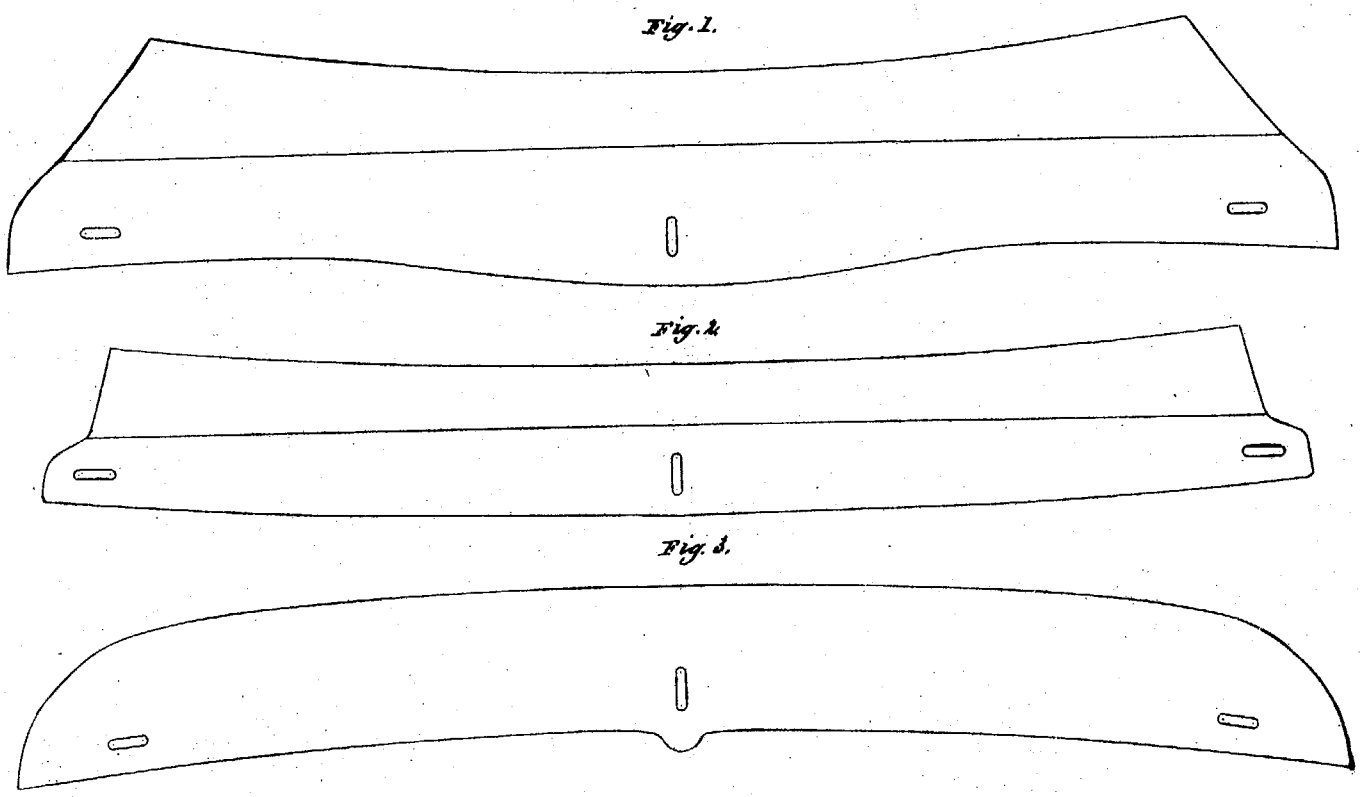
Witnesses.
Jno. D. Parker
Ted. C. Chamberlain
James A. Woodbury.
By atty A. B. Stoughton.
NORRIS PETERS, INC., LITHO., WASHINGTON, D. C.

UNITED STATES PATENT OFFICE.

JAMES A. WOODBURY, OF BOSTON, MASSACHUSETTS, ASSIGNEE OF ANDREW A. EVANS.

IMPROVEMENT IN PAPER SHIRT-COLLARS.

Specification forming part of Letters Patent No. 38,664, dated May 26, 1863; Reissue No. 2,309, dated July 10, 1866.

DIVISION A.

*To all whom it may concern:*

Be it known that ANDREW A. EVANS, of Boston, in the county of Suffolk and State of Massachusetts, did invent a new and useful Improvement in Shirt-Collars; and I do hereby declare that the following is a full, clear, and exact description of the same.

Previous to the invention of the said ANDREW A. EVANS collars were made of paper applied to some woven fabric, the paper serving the purpose of giving to the loose and limber fabric the body, rigidity of stiffness, and general appearance of a starched linen collar, while the backing of cloth or fabric gave it the necessary strength or resistance. The increasing cost of the backing and the difficulty attending the manufacture render the collars, intended to be worn as a general thing but once, too expensive to answer the purpose they were designed for. The object of the said EVANS was, therefore, to make a paper collar in which the cloth backing may be dispensed with, and which he did, as follows:

Said EVANS discovered as the result of many experiments that in order to produce a really good collar the paper must possess the following qualities—viz., strength to withstand the usual wear and tear, particularly where button-holes are used, without excessive thickness, such as to destroy the resemblance to a starched linen collar, and tenacity or toughness with pliability sufficient to allow the collar to be folded upon itself without cracking at the fold, and the pureness of color and necessary polish to make it resemble starched linen. He (said EVANS) made his collars out of a paper which he produced, or caused to be produced, in which he combined these qualities, which paper was made of a long fiber, substantially in this respect like bank-note paper, but of about the same thickness as that of an ordinary collar, and of a pure shade or color such as to resemble starched linen. By means of the length of fiber in the material he was enabled to obtain from the degree of thickness above specified a sufficient degree of strength, tenacity and pliability to make a collar practically useful for wear without interfering with the resemblance in appearance to a linen collar. A sample of the paper which he thus found suitable and used is shown filed with the original application of the said EVANS for his patent above referred to.

To produce a paper having the above-mentioned qualities, what is known as "hard stock" should be used in larger proportion than is required for other descriptions of paper, except for that which is known as "bank-note" paper, and in the process of pulping the stock dull knives should be used, and the distance of the knives or beaters and their mode of striking the knife-bar should be so arranged as to draw out the pulp instead of chopping it short, constituting what is known as the "long-beating" process, and this long beating should be continued for a great length of time so that the fiber shall be not only long but fine, and thereby the paper not only be more strong but more smooth and even, and the fiber become bedded in the thickness of the paper, so as not to mar the surface. After the stock is thus pulped, the paper, if made upon a cylinder-machine, may be run off in two or more sheets of pulp, which may be united as they run from several cylinders and pass together one over the other, under the press or rolls, into one sheet of the required thickness, or one sheet may be first run off upon a reel and then united in the same manner with another sheet running from the cylinder and both passing under the rolls together; but the former mode is found preferable in practice, as the several sheets are in that case of equal degrees of moisture, and therefore form in that state a more perfect union. In case a single sheet is used made upon a cylinder-machine, as its thickness and length of fiber tend to retain the moisture, great care must be taken to expel the water from the pulp. In case a Fourdrinier machine is used the paper may be made of the required thickness from a single sheet of pulp; but the "wire" on which the pulp is formed should be supplied with extra suction-boxes to remove the water, and its forward motion should be much slower than in the manufacture of ordinary paper, while the lateral or vibratory motion of the wire should be as rapid or more rapid than usual in order to afford greater time and motion for extracting the moisture from the pulp. Care should also be used to give to the paper in the pulp the slight bluish tinge which is found in starched linen, and to prevent its having a dead or yellowish white color.

The invention of said EVANS is not confined to the use of any specific proportion of hard stock, nor to any specific time or mode of long beating of the pulp, nor any specific method of running off or uniting the sheet of pulp, or of exhausting the moisture, or of giving the required tint; but it is believed that the quality of stock to be used, and the process by which the length of fiber and the required shade of color are produced will be readily understood by paper manufacturers having regard to the above description and the purposes for which the paper is designed.

This paper may be prepared with animal sizing, and when so prepared it is known in the trade as "parchment" paper, or such sizing may be dispensed with.

The paper may also be covered on one or both sides with a thin varnish of bleached shellac and allowed to dry, or such varnishing may be dispensed with. The paper having been passed between polishing-rollers, such as are in general use for polishing paper or cloth, is ready to be made into collars.

The collars are cut out and the button-holes, if any, are punched by dies, and the collar may be indented along a line running parallel with the exposed edges, so as to imitate the stitching of sewed collars, and of such various patterns or shapes as are in use, either "stand-up" or "turn-over," and provided, if required, with button-holes, by means of which they might be attached to shirts in the usual manner, and as represented in the accompanying drawings, marked respectively Figs. 1, 2, and 3.

What is claimed under this patent as the invention of the said ANDREW A. EVANS, and desired to be secured by Letters Patent, as a new article of manufacture, is—

A collar made of long-fiber paper, substantially such as is above described.

JAMES A. WOODBURY.

Witnesses:
A. B. STOUGHTON,
JOHN S. HOLLINGSHEAD.